United States Patent
Hagelstrom et al.

(10) Patent No.: US 10,574,688 B1
(45) Date of Patent: Feb. 25, 2020

(54) IGMP GROUP LEAVE MESSAGE BLOCKING

(71) Applicant: Architecture Technology Corporation, Eden Praire, MN (US)

(72) Inventors: Ryan L. Hagelstrom, Chaska, MN (US); Ranga S. Ramanujan, Medina, MN (US); Nathan E. Bahr, Eden Prairie, MN (US)

( * ) Notice: Subject to any disclaimer, the term of this patent is extended or adjusted under 35 U.S.C. 154(b) by 72 days.

(21) Appl. No.: 15/611,106

(22) Filed: Jun. 1, 2017

Related U.S. Application Data

(60) Provisional application No. 62/344,058, filed on Jun. 1, 2016.

(51) Int. Cl.
*H04L 29/06* (2006.01)
*H04L 29/12* (2006.01)

(52) U.S. Cl.
CPC ...... *H04L 63/1441* (2013.01); *H04L 61/2069* (2013.01); *H04L 63/1433* (2013.01)

(58) Field of Classification Search
CPC .......... H04L 63/1441; H04L 61/2069; H04L 63/1433
USPC ..................................... 726/25, 26
See application file for complete search history.

(56) References Cited

U.S. PATENT DOCUMENTS

| | | |
|---|---|---|
| 6,606,706 B1 | 8/2003 | Li |
| 6,870,842 B1 | 3/2005 | Caronni et al. |
| 8,090,805 B1 | 1/2012 | Chawla et al. |
| 8,434,139 B1 | 4/2013 | Ortiz |
| 9,025,600 B1 | 5/2015 | Vitt et al. |
| 9,860,169 B1 | 1/2018 | Ninan et al. |
| 9,998,955 B1 | 6/2018 | MacCarthaigh |
| 10,097,454 B1 | 10/2018 | MacCarthaigh |
| 2002/0186694 A1* | 12/2002 | Mahajan ............. H04L 12/4641 370/390 |
| 2003/0123453 A1* | 7/2003 | Ooghe ................ H04L 12/1886 370/395.53 |
| 2005/0089050 A1 | 4/2005 | Cheriton |
| 2008/0062861 A1 | 3/2008 | Shand et al. |
| 2009/0067330 A1 | 3/2009 | Shand et al. |

(Continued)

OTHER PUBLICATIONS

"Configuring DHCP Features and IP Source Guard Features", CISCO, Accessed May 24, 2017, http://www.cisco.com/c/en/us/td/docs/switches/lan/catalyst4500/12-2/37sg/configuration/guides/config/dhcp.html?referring_site=RE&pos=1&page=http://www.cisco.com/c/en/us/td/docs/switches/lan/catalyst6500/ios/12-2SY/configuration/guide/sy_swcg/ip_source_guard.html, pp. 1-30.

(Continued)

*Primary Examiner* — Evans Desrosiers
(74) *Attorney, Agent, or Firm* — Carlson, Caspers, Vandenburgh & Lindquist, P.A.

(57) ABSTRACT

A method of cyber-attack protection is provided. The method includes receiving one or more internet group management protocol (IGMP) membership report messages on one or more ports of a network switch. A table is maintained associating each of the one or more ports to the one or more group addresses of which any hosts coupled to that port are members. An IGMP group leave message is received at a first port of the network switch. A group address in the group leave message is compared to all group addresses associated in the table with the first port. If the group address in the group leave message does not match any group address associated with the first port, the group leave message is dropped without being acted on in accordance with IGMP.

20 Claims, 7 Drawing Sheets

(56) References Cited

U.S. PATENT DOCUMENTS

| | | |
|---|---|---|
| 2014/0086243 A1 | 3/2014 | Shepherd et al. |
| 2015/0146603 A1 | 5/2015 | Wu et al. |
| 2016/0105399 A1 | 4/2016 | Rung et al. |
| 2016/0127306 A1 | 5/2016 | Wang et al. |
| 2017/0118176 A1 | 4/2017 | Okhravi et al. |
| 2019/0014092 A1 | 1/2019 | Malek et al. |

OTHER PUBLICATIONS

"Configuring IPv4 IGMP Filtering and Router Guard", CISCO, Accessed May 24, 2017, http://www.cisco.com/en/US/docs/general/Test/dwerblo/broken_guide/igmpfilt.html, pp. 1-12.

Deering, S., "Host Extensions for IP Multicasting" RFC 1112, Network Working Group, Aug. 1989, pp. 1-17, USA.

Fenner, W., "Internet Group Management Protocol (IGMP), Version 2" RFC 2236, Network Working Group, Nov. 1997, pp. 1-24, USA.

Holbrook, H., "Using Internet Group Management Protocol (IGMPv3) Version 3 and Multicast Listener Discovery Protocol Version 2 (MLDv2) for Source-Specific Multicast" RFC 4604, Network Working Group, Aug. 2006, pp. 1-11, USA.

U.S. Patent and Trademark Office, "Office Action", U.S. Appl. No. 15/611,127, dated Jun. 27, 2019, pp. 1-11.

U.S. Patent and Trademark Office, "Office Action", U.S. Appl. No. 15/611,074, dated May 24, 2019, pp. 1-18.

U.S. Patent and Trademark Office, "Office Action—Final Rejection", U.S. Appl. No. 15/611,074, Nov. 1, 2019, pp. 1-20.

* cited by examiner

IGMP GROUP LEAVE MESSAGE BLOCKING

RELATED APPLICATIONS

This application claims the benefit of U.S. Provisional Application No. 62/344,058, filed on Jun. 1, 2016, entitled "CYBER HARDENING AND AGILITY TECHNOLOGIES FOR TACTICAL IP NETWORKS", which is hereby incorporated herein by reference.

GOVERNMENT CONTRACTS

This invention was made with government support under contract FA8750-15-C-0254 awarded by the Air Force Research Laboratory (AFRL). The government may have certain rights in the invention.

BACKGROUND

Internet Group Management Protocol (IGMP) has been used in networks for decades. IGMP, however, is subject to cyber-attacks in which a malicious node can unsubscribe a host from a multicast group. Accordingly, there is a need in the art to address the threat of cyber-attacks implemented by unsubscribing a host from a multicast group in IGMP.

BRIEF DESCRIPTION

Embodiments for a method of cyber-attack protection are provided. The method includes receiving one or more internet group management protocol (IGMP) membership report messages on one or more ports of a network switch. A table is maintained associating each of the one or more ports to the one or more group addresses of which any hosts coupled to that port are members, wherein the one or more group addresses are provided by one or more the IGMP membership report messages. An IGMP group leave message is received at a first port of the network switch. A group address in the IGMP group leave message is compared to all group addresses associated in the table with the first port. If the group address in the IGMP group leave message matches any group address associated with the first port, the IGMP group leave message is acted on in accordance with IGMP. If the group address in the IGMP group leave message does not match any group address associated with the first port, the IGMP group leave message is dropped without being acted on in accordance with IGMP.

Embodiments for a processor readable medium are also provided. The embodiments include a processor readable medium having instructions stored thereon. The instructions, when executed by one or more processing devices, cause the one or more processing devices to configure a data plane of a network switch. The instructions configure the data plane of the network switch to receive one or more internet group management protocol (IGMP) membership report messages on one or more ports of a network switch. The data plane is also configured to maintain a table associating each of the one or more ports to the one or more group addresses of which any hosts coupled to that port are members, wherein the one or more group addresses are provided by one or more the IGMP membership report messages. The data plane is also configured to receive an IGMP group leave message at a first port of the network switch. The data plane is also configured to compare a group address in the IGMP group leave message to all group addresses associated in the table with the first port. If the group address in the IGMP group leave message matches any group address associated with the first port, the data plane is configured to act on the IGMP group leave message in accordance with IGMP. If the group address in the IGMP group leave message does not match any group address associated with the first port, the data plane is configured to drop the IGMP group leave message without acting on the IGMP group leave message in accordance with IGMP.

Embodiments for a controller for a data plane of a network switch are also provided. The controller includes one or more processing devices, and a data storage medium coupled to the one or more processing devices. The data storage medium has instructions stored thereon, wherein the instructions, when executed by the one or more processing devices, cause the one or more processing devices to configure the data plane of the network switch. The instructions configure the data plane of the network switch to receive one or more internet group management protocol (IGMP) membership report messages on one or more ports of a network switch. The data plane is also configured to maintain a table associating each of the one or more ports to the one or more group addresses of which any hosts coupled to that port are members, wherein the one or more group addresses are provided by one or more the IGMP membership report messages. The data plane is also configured to receive an IGMP group leave message at a first port of the network switch. The data plane is also configured to compare a group address in the IGMP group leave message to all group addresses associated in the table with the first port. If the group address in the IGMP group leave message matches any group address associated with the first port, the data plane is configured to act on the IGMP group leave message in accordance with IGMP. If the group address in the IGMP group leave message does not match any group address associated with the first port, the data plane is configured to drop the IGMP group leave message without acting on the IGMP group leave message in accordance with IGMP.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
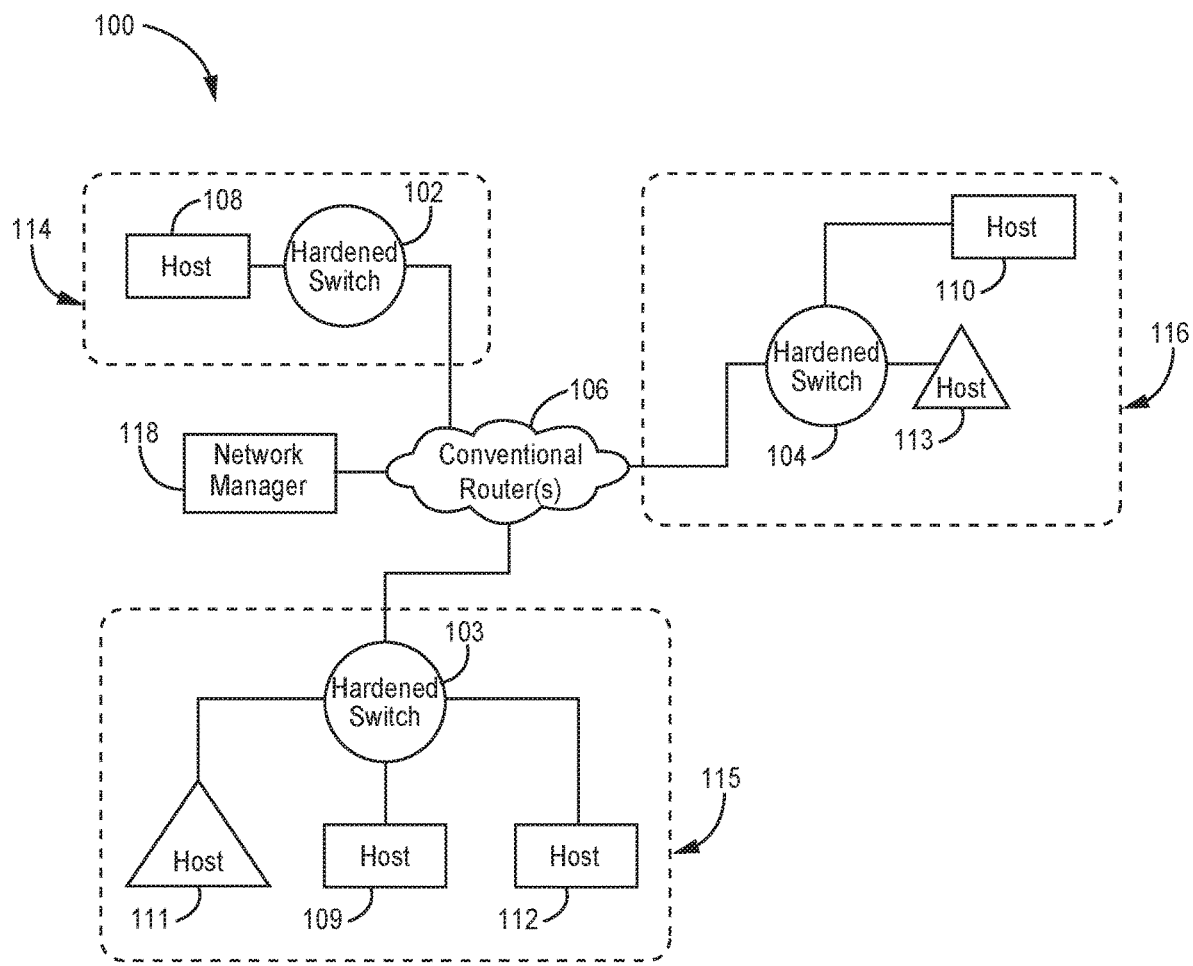
FIG. 1 is a block diagram of an example network that includes one or more hardened network switches that address the threat of cyber-attack via group unsubscription in Internet Group Management Protocol (IGMP)

FIG. 1 is a block diagram of an example network 100 including one or more hardened network switches 102-104 that address the threat of cyber-attack via group unsubscription in IGMP. Along with the one or more hardened switches 102-104, one or more conventional routers, shown as cloud 106, can also be included in network 100. The one or more hardened switches 102-104 and one or more conventional routers 106 are communicatively coupled together through wired and/or wireless network links, such that Internet Protocol (IP) packets can be routed across the network 100.

One or more hosts 108-113 can be communicatively coupled to each hardened switch 102-104 via a respective wired or wireless network link. Each hardened switch 102-104 forwards packets between the conventional routers 106 and the host(s) 108-113 coupled to that switch 102-104. The hosts 108-113 coupled to a hardened switch 102-104 and the hardened switch 102-104 can operate in a LAN 114-116. Although a single host 108-113 is shown coupled to each switch 102-104, it should be understood that any number of hosts can be coupled to each switch 102-104.

Each host 108-113 can comprise any entity capable of communicating IP packets with the hardened switches 102-104. An example host 108-113 includes a personal computer (e.g., laptop, desktop, tablet), a smart phone, a radio over IP (RoIP) device, voice over IP (VoIP) telephone, network peripheral device (e.g., printer), and a networking device (e.g., router, switch, hub).

One or more devices can be included between a host 108-113 and the hardened switch 102-104 which the host 108-113 is coupled to, such as a bridge, hub, and/or inline network encryptor (INE). Additionally, one or more devices can be included between a hardened switch 102-104 and the conventional routers 106 and/or between respective conventional routers 106, such as an INE or a radio which generates a link communicatively coupling the hardened switch 102-104 to the conventional routers 106.

Each switch 102-104 can be a standalone device or can be integrated into another device, such as a router or communication radio. Each switch 102-104 includes a data plane that implements forwarding rules to forward packets between the ports of the switch 102-104. The data plane of each switch 102-104, 106 is configured by a controller, which is part of the control plane of the switch 102-104, 106. The controller can be integrated into a common device (e.g., switch 102) with the data plane, as in a traditional switch, or can be implemented in a device distinct from the data plane, as in software defined networking (SDN).

A network manager 118 can communicate management plane control messages to the controller(s) 204 for hardened switches 102-104. The control messages from the network manager 118 can control the controller(s) 204 to enable centralized control over the hardened switches 102-104 in the network 100. In an example, the network manager 118 can be communicatively coupled to the network 100, and can send the management plane control messages to the hardened switches 102-104 as network packets. The management plane control messages can take any suitable form including, but not limited to, simple network management protocol (SNMP) messages.

Figure 2:
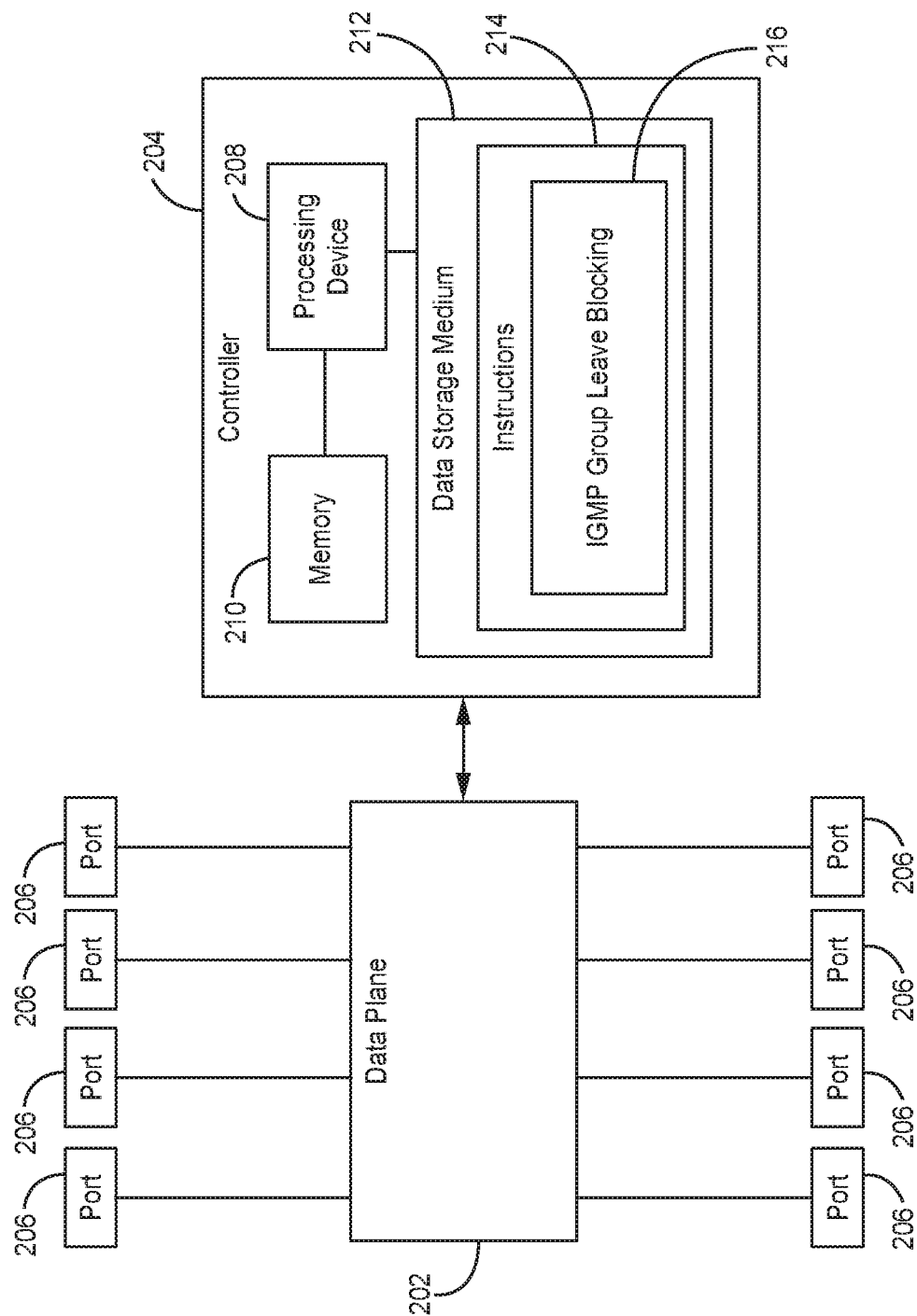
FIG. 2 is a block diagram of an example data plane and controller for a hardened network switch of FIG. 1.

FIG. 2 is a block diagram of an example data plane 202 and controller 204 for a hardened switch 102-104. As mentioned above, the data plane 202 implements the forwarding rules provided by the controller 204 to forward packets between a plurality of hardware ports 206 of the switch 102-104. The data plane 202 can be a hardware matrix, or can be software implemented as in a virtual switch.

The controller 204 includes one or more processing devices 208 coupled to memory 210. The one or more processing devices 208 can include any one or more of a general-purpose processor (e.g., a central processing unit (CPU)) and a special-purpose processor (e.g., a digital signal processor (DSP) or graphics processing unit (GPU)). Memory 210 can include any suitable form of random access memory (RAM) now known or later developed, such as dynamic random-access memory (DRAM), as well as other types of memory. The controller 204 also includes one or more data storage mediums 212 coupled to the one or more processing devices 208. The one or more data storage mediums 212 can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM. The controller 204 includes instructions 214 stored or otherwise embodied on its respective one or more data storage mediums 212. The instructions 214, when executed by the one or more processing devices 208 of the controller 204, cause the controller 204 to perform the actions coded in the instructions 214.

The instructions 214 on the controller 204 include instructions 216 to configure the data plane 202 to forward packets according to the protocol implemented by the controller 204. In examples where the controller 204 is disposed on a common device with the data plane 202, the controller 204 can configure the data plane directly. In examples where the controller 204 is disposed on a distinct device from the data plane 202, the controller 204 can communicate configuration commands to a client module on the switch 102-104 that includes the data plane 202. The client module on the switch 102-104 can then configure the data plane in accordance with the configuration commands. The configuration commands can be sent as network messages from the controller 204 to the client module on the switch 102-104. A single controller 204 can control a single data plane 202 or a single controller 204 can control (i.e., configure) multiple data planes 202 (i.e., multiple switches). The controller 204 can provide cyber-attack protection on the switch 102-104 by configuring the data plane to reduce the ability to unsubscribe hosts using IGMP.

Figure 3A:
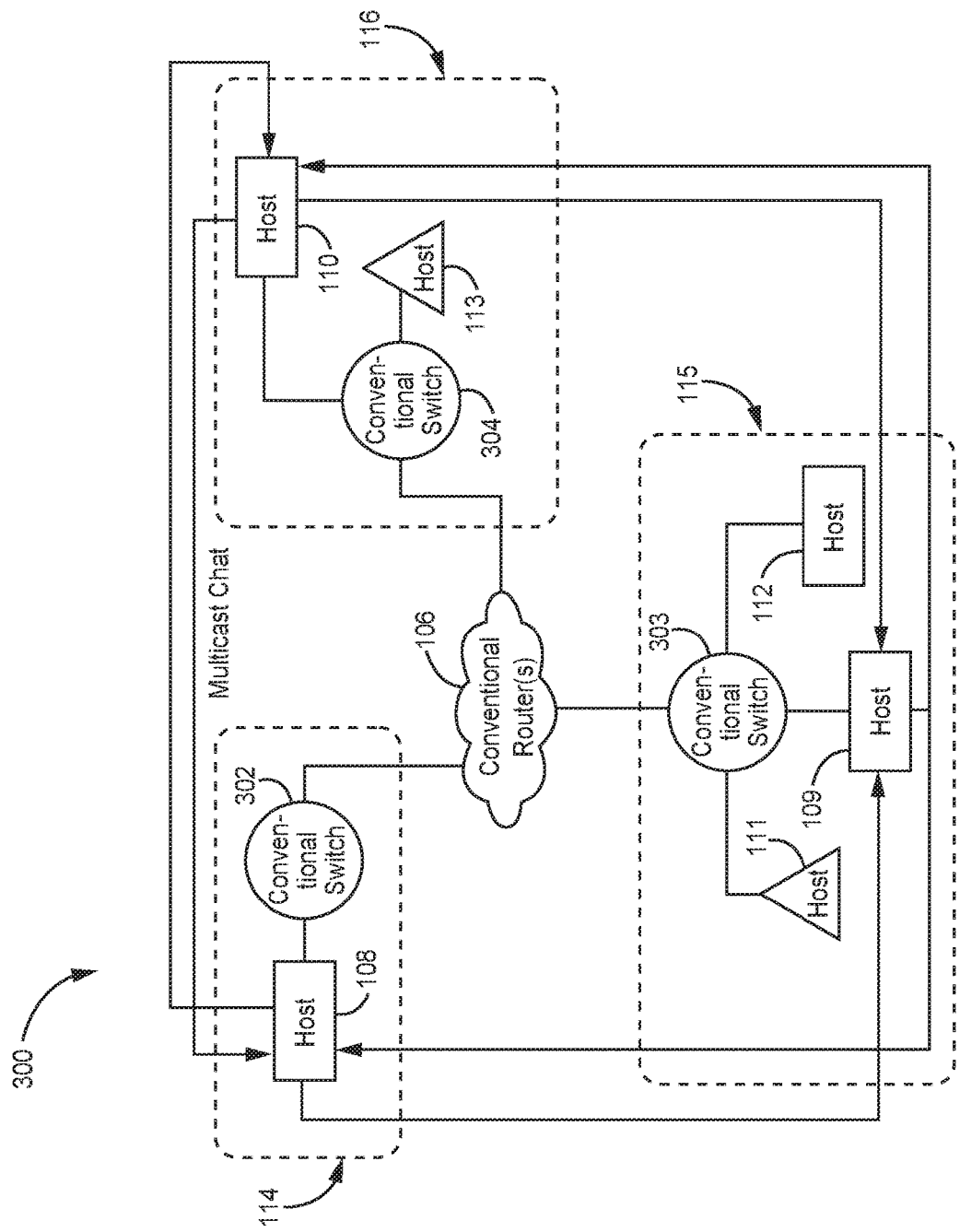
FIGS. 3A-3C are block diagrams of an example network in which a malicious host is unsubscribing another host using IGMP.
Figure 3B:
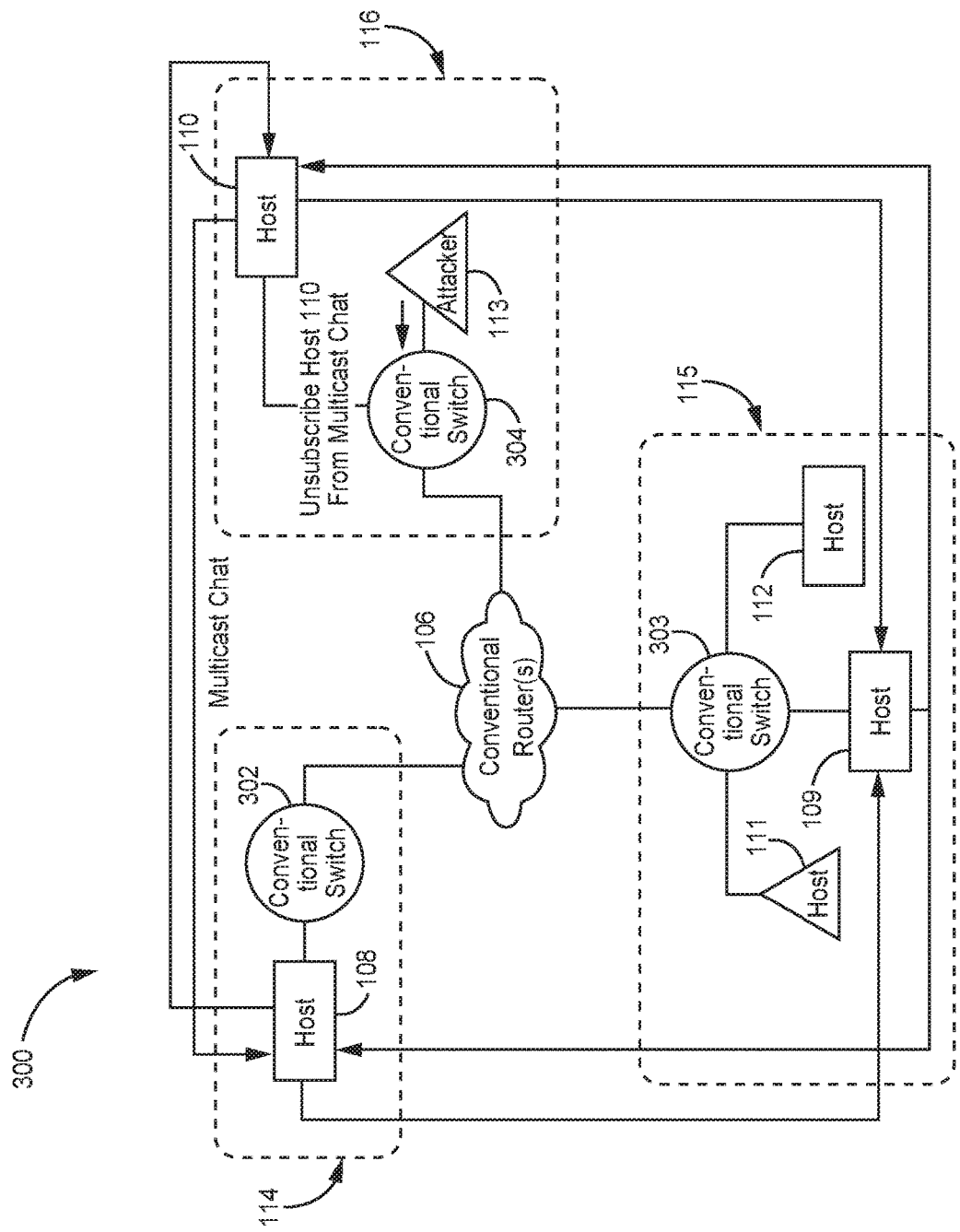
Figure 3C:
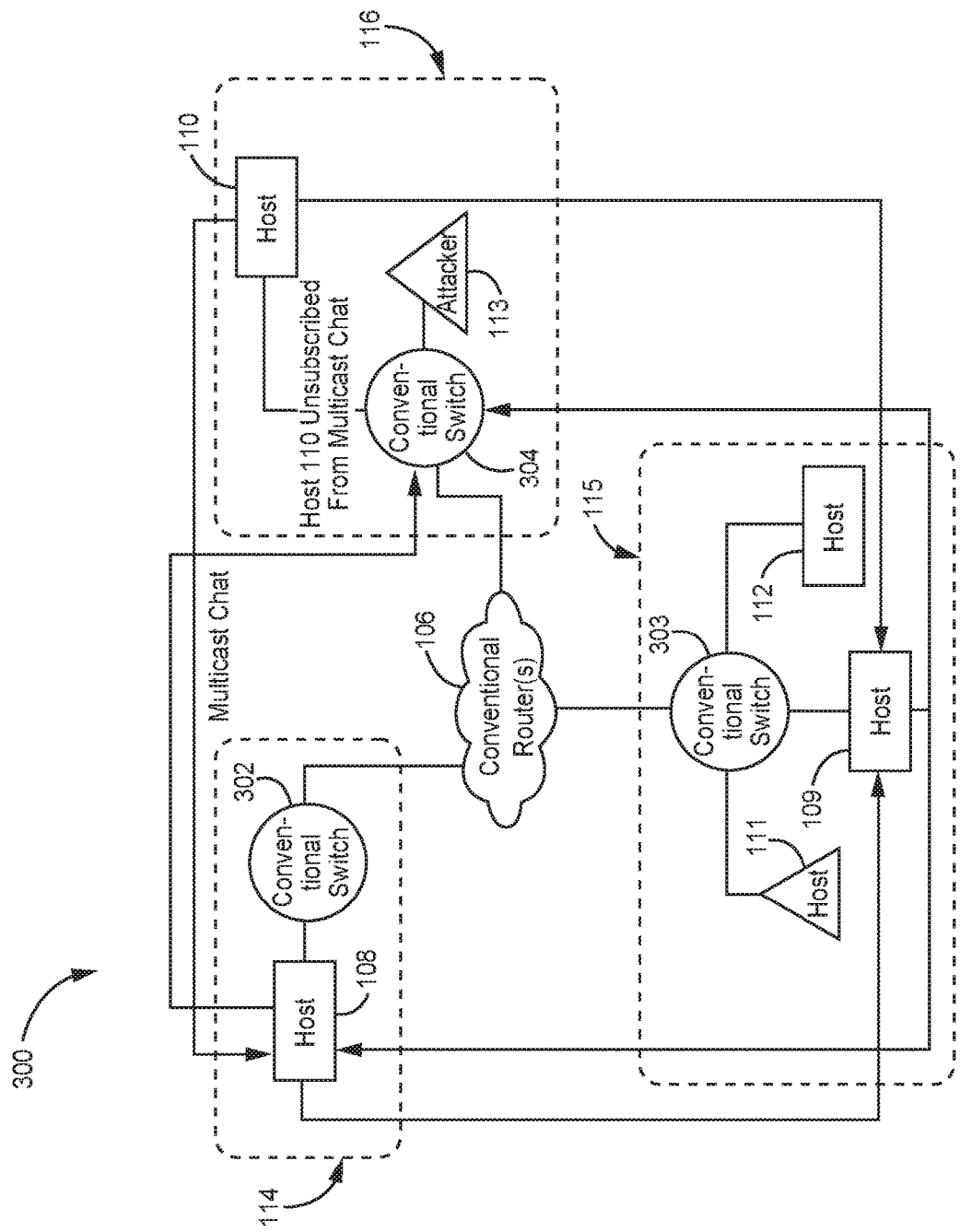

FIGS. 3A-3C are block diagrams of an example network 300 in which a malicious host 109 is attempting to unsubscribe another host from a multicast group. Network 300 is similar to network 100 except the plurality of hosts 108-113 are coupled to conventional (non-hardened) switches 302-304 instead of a hardened switch 102-104.

As shown in FIG. 3A, host 108, host 109, and host 110 are in a multicast chat session with one another. To implement the multicast chat session, host 108 is a member of a first multicast group with a first group address, and host 109 and host 110 are sources for the first multicast group. Host 109 is a member of a second multicast group with a second group address, with host 108 and host 110 sources for the second multicast group. Host 110 is a member of a third multicast group with a third group address, with host 108 and host 109 sources for the third multicast group.

As shown in FIG. 3B, a malicious host 113 in the same subnet as host 110 sends a falsified IGMP group leave message impersonating host 110. The falsified group leave message indicates that host 110 would like to leave the third multicast group. Conventional switch 104 receives the falsified group leave message and, not knowing the message is falsified, unsubscribes from the third multicast group.

As shown in FIG. 3C, as a result, host 110 stops receiving the multicast traffic from host 108 and host 109. At worst, this would prevent the multicast streams from host 108 and host 109 from ever being received by host 110. At best, the delivery of the multicast streams from host 108 and host 109 could be intermittent and severely interrupted.

Figure 4:
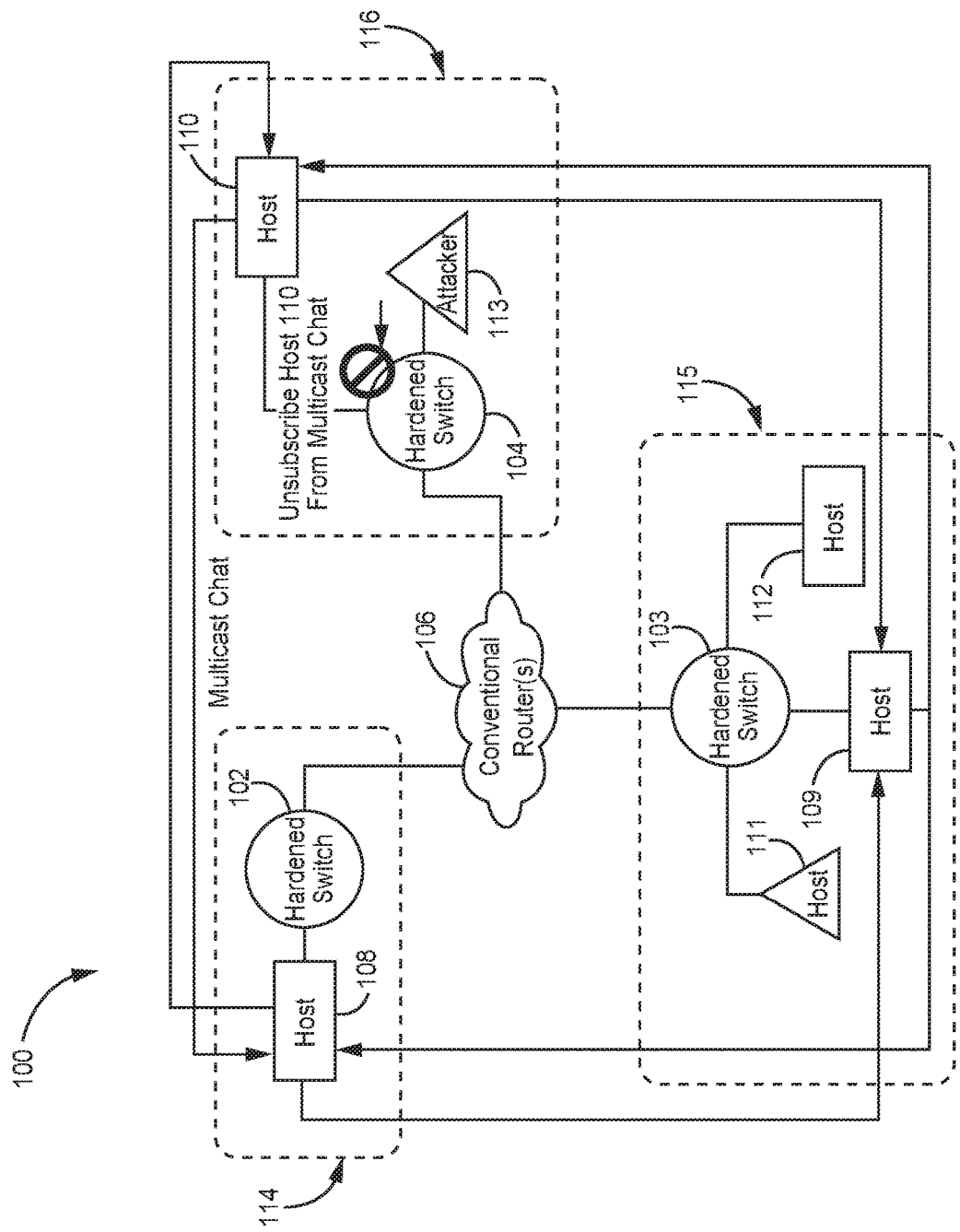
FIG. 4 is a block diagram of the network of FIG. 1 in which one of the hardened network switches blocks a malicious host from unsubscribing another host.

FIG. 4 is a block diagram of network 100, wherein the conventional switches 302-304 of network 300 are replaced with the hardened switches 102-104, and malicious host 113 is attempting to unsubscribe host 110 from the third multicast group. In contrast to conventional switches 302-304, hardened switches 102-104 can recognize falsified IGMP group leave messages and will block them, preventing the falsified IGMP group leave message from unsubscribing host 110 from the third multicast group.

Figure 5:
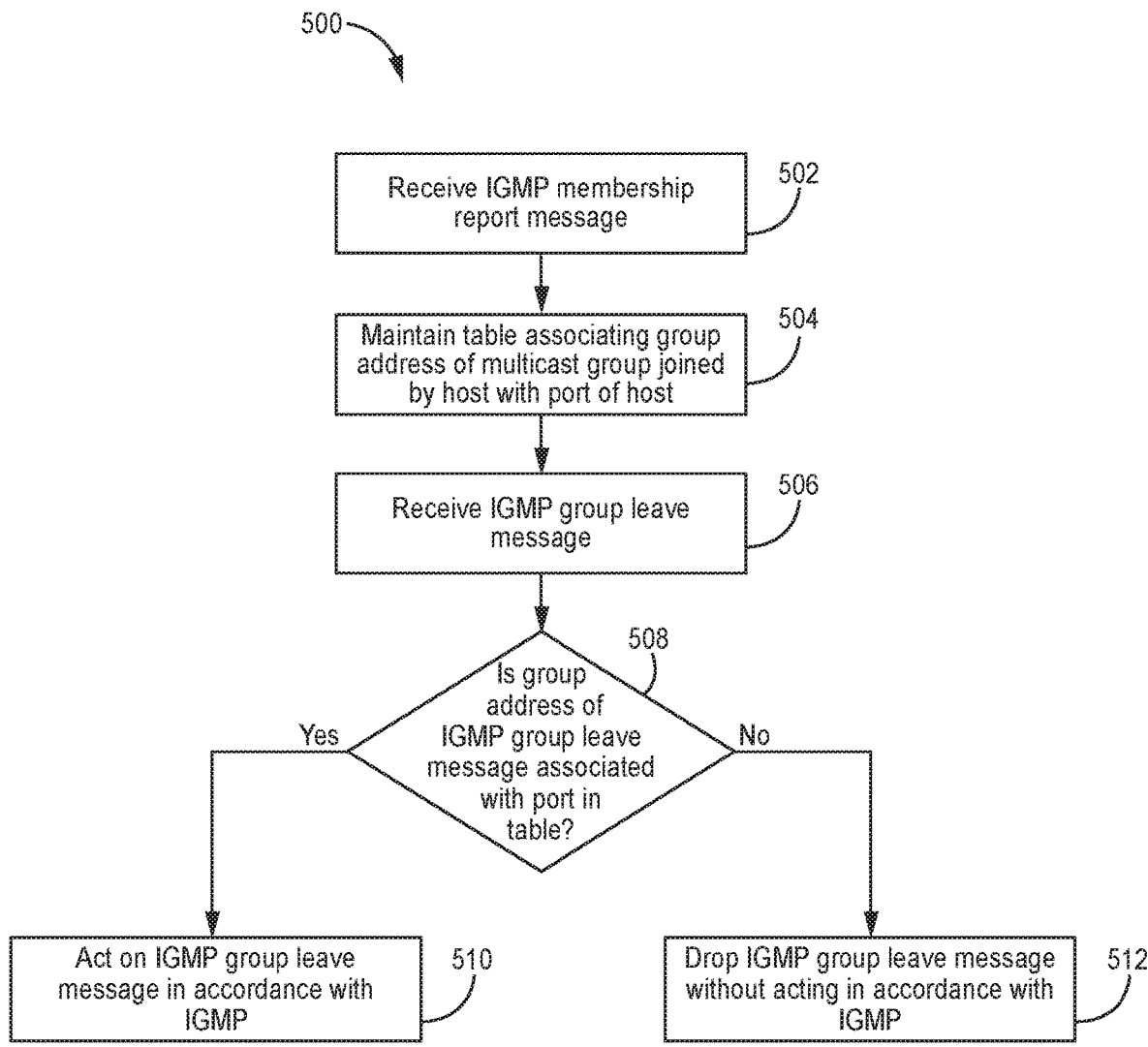
FIG. 5 is a flow diagram of an example method of recognizing and blocking falsified IGMP group leave messages.

FIG. 5 is a flow diagram of an example method 500 of recognizing and blocking falsified IGMP group leave messages at a hardened switch 102-104. Method 500 includes receiving one or more IGMP membership report messages on one or more ports of a hardened switch 102-104 (block 502). An IGMP membership report message is sent by a host to indicate the desire to be a member of a multicast group. An IGMP membership report message identifies the multicast group of which the host desires to become a member with an IP address in the group address field of the IGMP membership report message.

The controller 208 for the hardened switch 102-104 maintains a table individually associating the ports of the hardened switch 102-104 with the one or more group address of which any hosts coupled to that port are members (block 504). That is, for each port of the hardened switch 102-104, the table indicates which one or more group addresses any hosts coupled to that port are members of. For example, if host 110 is coupled to port 01 of switch 104 and is a member of the third multicast group having a third group address, the table maintained by the controller 208 of switch 104 associates port 01 with the third group address. If host 113 is coupled to port 02 of switch 104 and is a member of a fourth multicast group having a fourth group address, the table maintained by the controller would associate port 02 with the fourth group address along with associating port 01 with the third multicast address. In this way, the ports of switch 104 can be individually associated with one or more group addresses, wherein the one or more group address are group address of which hosts coupled to that port are members.

The controller 208 can learn the group addresses to associate with each port by reading the IGMP membership report messages received. For a IGMP membership report message received, the controller 208 can store the group address in the membership report in the table along with an association of that group address to the port of the switch 104 on which the IGMP membership report message was received. The controller 208 can store the group address in the table for each IGMP membership report message received, unless the group address is already associated with that port.

Maintaining the table can also include removing a group address from the table when no hosts coupled to the port associated with the group address are members of the group address any more. Thus, group addresses are deleted from the table when their corresponding hosts are no longer members. Hosts can discontinue membership in a group by sending an IGMP group leave message or by not responding to an IGMP query message within a certain time period. Accordingly, the controller 208 can reach IGMP query messages and IGMP group leave messages to ascertain group membership and, in particular, to ascertain when a host coupled to a port leaves a group.

Using the table, the hardened switch 104 can recognize and block falsified IGMP group leave messages. In response to an IGMP group leave message being received at a first port (block 506), the switch 104 can compare the group address in the IGMP group leave message to all group addresses in the table associated with the first port (block 508). That is, the group address in the IGMP group leave message can be compared to any group address of which a host coupled to the first port is currently a member of. The group address of the IGMP group leave message is the IP address in the group address field of the IGMP group leave message.

If the group address in the IGMP group leave message matches any group address associated with the first port, the IGMP group leave message is likely valid and the switch 104 acts on the IGMP group leave message in accordance with IGMP (i.e., in the normal manner) (block 510). If the group address in the IGMP group leave message does not match any group address associated with the first port, the IGMP group leave message is likely falsified and the switch 104 drops the IGMP group leave message without acting on the IGMP group leave message in accordance with IGMP (block 512). By dropping the IGMP group leave message, the hardened switch 104 does not unsubscribe from the group address of the falsified IGMP group leave message, and the multicast packets are still address to that group address are received by the hardened switch 104.

The hardened switch 104 can analyze all IGMP group leave messages received to protect against cyber-attacks which attempt to unsubscribe hosts from a multicast group. By keeping track of which group address hosts coupled to the switch have joined on a port-by-port basis, the switch 104 can identify IGMP group leave messages received on a port in which no host coupled to that port is a member of the particular group address. Such a IGMP group leave message is likely falsified, and switch 104 drops the IGMP group leave message as described with respect to method 500.

In an example, in response to recognizing a falsified IGMP group leave message, the hardened switches 102-104 can alert a network administrator (a human managing operation of the switches 102-104) to the falsified IGMP group leave message and/or log the reception of the IGMP group leave message. The alert to the network administrator can be in any appropriate form such as a message to the network manager 118 or a message directly to the network administrator (e.g., an email, text message, etc.).

Advantageously, the hardened switches 102-104 can recognize and drop falsified IGMP group leave messages while maintaining compatibility IGMP. That is, devices communicating with the hardened switches 102-104 do not need to be updated. These devices can continue to use IGMP in a conventional manner.

The IGMP version used can include any of version 1 defined in the Network Working Group Request for Comments (RFC) 1112, version 2 defined in Network Working Group RFC 2236, or version 3 defined in Network Working Group RFC 4604. Accordingly, the IGMP group leave message can include a group leave message in accordance with any of IGMP versions 1-3 or an IGMP MODE_IS_EXCLUDE message conforming to IGMP version 3. Network Working Group RFC 1112, Network Working Group RFC 2236, and Network Working Group RFC 4604 are incorporated herein by reference.

In an example, a first one or more of the ports of the switch 104 can be assigned as trusted and a second one or more ports of the switch 104 can be assigned as untrusted. IGMP membership report messages and IGMP group leave messages received on trusted ports do not need to be acted as by method 500, while IGMP membership report messages received on untrusted ports can be acted on as described herein by method 500.

What is claimed is:

1. A method of cyber-attack protection, the method comprising:
   receiving one or more internet group management protocol (IGMP) membership report messages on one or more ports of a network switch;
   maintaining a table associating each of the one or more ports to the one or more group addresses of which any hosts coupled to that port are members, the one or more group addresses provided by the one or more IGMP membership report messages;
   receiving an IGMP group leave message at a first port of the network switch;
   comparing a group address in the IGMP group leave message to all group addresses associated in the table with the first port;
   if the group address in the IGMP group leave message matches any group address associated with the first port, acting on the IGMP group leave message in accordance with IGMP; and
   if the group address in the IGMP group leave message does not match any group address associated with the first port, dropping the IGMP group leave message without acting on the IGMP group leave message in accordance with IGMP.

2. The method of claim 1, wherein the IGMP group leave message includes one of an IGMP group leave message conforming to one of IGMP versions 1, 2, or 3, or an IGMP MODE_IS_EXCLUDE message conforming to IGMP version 3.

3. The method of claim 1, wherein maintaining a table includes updating the table such that the one or more group addresses associated with each of the one or more ports reflects a current state for any hosts coupled to that port.

4. The method of claim 1, wherein the group address of all IGMP group leave messages received at the network switch is compared to the one or more group addresses of which hosts coupled to the port at which each IGMP group leave message was received are members.

5. The method of claim 1, wherein acting on the IGMP leave message in accordance with IGMP includes acting on the IGMP message in accordance with one of IGMP versions 1, 2, or 3.

6. The method of claim 1, comprising:
   assigning a first one or more ports of the network switch as trusted ports and a second one or more ports of the network switch as untrusted ports, wherein IGMP group leave messages received on the one or more untrusted ports are compared with the one or more group addresses in the table and IGMP group leave messages received on the one or more trusted ports are not compared with the one or more group addresses in the table and are acted on in accordance with IGMP.

7. The method of claim 1, wherein maintaining a table includes associating a group address with a port if any host coupled to that port is currently a member of the group address.

8. A processor readable medium comprising:
   instructions stored thereon, wherein the instructions, when executed by one or more processing devices, cause the one or more processing devices to configure a data plane of a network switch to:
   receive one or more internet group management protocol (IGMP) membership report messages on one or more ports of the network switch;
   maintain a table associating each of the one or more ports to the one or more group addresses of which any hosts coupled to that port are members, the one or more group addresses provided by the one or more IGMP membership report messages;
   receive an IGMP group leave message at a first port of the network switch;
   compare a group address in the IGMP group leave message to all group addresses associated in the table with the first port;
   if the group address in the IGMP group leave message matches any group address associated with the first port, act on the IGMP group leave message in accordance with IGMP; and
   if the group address in the IGMP group leave message does not match any group address associated with the first port, drop the IGMP group leave message without acting on the IGMP group leave message in accordance with IGMP.

9. The processor readable medium of claim 8, wherein the IGMP group leave message includes one of an IGMP group leave message conforming to one of IGMP versions 1, 2, or 3, or an IGMP MODE_IS_EXCLUDE message conforming to IGMP version 3.

10. The processor readable medium of claim 8, wherein maintain a table includes update the table such that the one or more group addresses associated with each of the one or more ports reflects a current state for any hosts coupled to that port.

11. The processor readable medium of claim 8, wherein the group address of all IGMP group leave messages received at the network switch is compared to the one or more group addresses of which hosts coupled to the port at which each IGMP group leave message was received are members.

12. The processor readable medium of claim 8, wherein act on the IGMP leave message in accordance with IGMP includes act on the IGMP message in accordance with one of IGMP versions 1, 2, or 3.

13. The processor readable medium of claim 8, wherein the instructions cause the one or more processing devices to configure the data plane of the network switch to:
   assign a first one or more ports of the network switch as trusted ports and a second one or more ports of the network switch as untrusted ports, wherein IGMP group leave messages received on the one or more untrusted ports are compared with the one or more group addresses in the table and IGMP group leave messages received on the one or more trusted ports are not compared with the one or more group addresses in the table and are acted on in accordance with IGMP.

14. The processor readable medium of claim 8, wherein maintain a table includes associate a group address with a port if any host coupled to that port is currently a member of the group address.

15. A controller for a data plane of a network switch, the controller comprising:
   one or more processing devices;
   a data storage medium coupled to the one or more processing devices, the data storage medium having instructions stored thereon, wherein the instructions, when executed by the one or more processing devices, cause the one or more processing devices to configure the data plane of the network switch to:

receive one or more internet group management protocol (IGMP) membership report messages on one or more ports of the network switch;

maintain a table associating each of the one or more ports to the one or more group addresses of which any hosts coupled to that port are members, the one or more group addresses provided by the one or more IGMP membership report messages;

receive an IGMP group leave message at a first port of the network switch;

compare a group address in the IGMP group leave message to all group addresses associated in the table with the first port;

if the group address in the IGMP group leave message matches any group address associated with the first port, act on the IGMP group leave message in accordance with IGMP; and if the group address in the IGMP group leave message does not match any group address associated with the first port, drop the IGMP group leave message without acting on the IGMP group leave message in accordance with IGMP.

16. The controller of claim 15, wherein the IGMP group leave message includes one of an IGMP group leave message conforming to one of IGMP versions 1, 2, or 3, or an IGMP MODE_IS_EXCLUDE message conforming to IGMP version 3.

17. The controller of claim 15, wherein maintain a table includes update the table such that the one or more group addresses associated with each of the one or more ports reflects a current state for any hosts coupled to that port.

18. The controller of claim 15, wherein the group address of all IGMP group leave messages received at the network switch is compared to the one or more group addresses of which hosts coupled to the port at which each IGMP group leave message was received are members.

19. The controller of claim 15, wherein act on the IGMP leave message in accordance with IGMP includes act on the IGMP message in accordance with one of IGMP versions 1, 2, or 3.

20. The controller of claim 15, wherein the instructions cause the one or more processing devices to configure the data plane of the network switch to:

assign a first one or more ports of the network switch as trusted ports and a second one or more ports of the network switch as untrusted ports, wherein IGMP group leave messages received on the one or more untrusted ports are compared with the one or more group addresses in the table and IGMP group leave messages received on the one or more trusted ports are not compared with the one or more group addresses in the table and are acted on in accordance with IGMP.

* * * * *